US005522054A

United States Patent [19]
Gunlock et al.

[11] Patent Number: 5,522,054
[45] Date of Patent: May 28, 1996

[54] DYNAMIC CONTROL OF OUTSTANDING HARD DISK READ REQUESTS FOR SEQUENTIAL AND RANDOM OPERATIONS

[75] Inventors: Richard D. Gunlock; Mark R. Potter; William C. Galloway, all of Houston, Tex.

[73] Assignee: Compaq Computer Corporation, Houston, Tex.

[21] Appl. No.: 120,679

[22] Filed: Sep. 13, 1993

[51] Int. Cl.[6] ........................................ G06F 12/00
[52] U.S. Cl. .................... 395/439; 395/474; 395/200.08; 364/DIG. 1; 364/DIG. 2; 364/228.1; 364/248.1; 364/236.2; 364/251; 364/252
[58] Field of Search ................ 364/200 MS File, 364/900 MS File; 395/425, 200.08, 457, 474, 439–441

[56] References Cited

U.S. PATENT DOCUMENTS

| 4,495,571 | 1/1985 | Staplin, Jr. et al. | 395/293 |
|---|---|---|---|
| 4,509,119 | 4/1985 | Gumaer et al. | 395/250 |
| 4,831,622 | 5/1989 | Porter et al. | 371/10.1 |
| 4,937,788 | 6/1990 | Harada | 365/189.04 |
| 5,133,060 | 7/1992 | Weber et al. | 395/440 |
| 5,235,692 | 8/1993 | Ayres et al. | 395/849 |
| 5,325,509 | 6/1994 | Lautzenheiser | 395/464 |
| 5,392,445 | 2/1995 | Takamoto et al. | 395/800 |

OTHER PUBLICATIONS

PC User (ISA SCSI host adaptors), n207, p. 96(11) Mar. 24, 1993.

*Primary Examiner*—Matthew M. Kim
*Attorney, Agent, or Firm*—Pravel, Hewitt, Kimball & Krieger

[57] ABSTRACT

Computer system which varies the number of read requests outstanding to hard disk drives based on the mix of sequential and random requests. If a sequential request is received, a limited number of requests are allowed to be outstanding. If the requests are random, a growing number of read requests can be outstanding as the random requests continue, until a maximum number of write requests are allowed to be outstanding.

4 Claims, 12 Drawing Sheets

DYNAMIC CONTROL OF OUTSTANDING HARD DISK READ REQUESTS FOR SEQUENTIAL AND RANDOM OPERATIONS

BACKGROUND OF THE INVENTION

1. Field of the Invention

The invention relates to scheduling requests to hard disk drives, and more specifically to operations on a file server to dynamically control the number of outstanding read requests in a mixed sequential and random read environment.

2. Description of the Related Art

One of the major advancements in computer architecture in recent years has been the development of the local area networks (LAN). In a LAN, a number of workstations, which are generally personal computers, are connected over a common communications network, such as an Ethernet or Token Ring network, to a file server or a plurality of file servers. The file server serves certain minimal functions and in many cases can be extended to include other more complex functions. The minimal functions include printer sharing control and central storage of information which can be accessed by any of the workstations. This central storage is handled by the file server having a hard disk subsystem, conventionally of a very large size, which can be accessed by each of the workstations. One of the major tasks of the various file server operating system, such as NetWare from Novell or VINES from Banyan, is control of operation of the hard disk drives. To this extent, a major function of the operating system is to serve as a disk cache and scheduler of operations to the hard disk drives. For example, in NetWare a significant portion of the memory used in the file server is dedicated to form a cache for the disk data. This is desired so that as many operations as possible can be handled directly by the cache. For example, read operations can be directly handled from the cache without any requests to the hard disk drives and write operations can be posted to the cache, so that the workstation can continue its operation without actually waiting for the data to be written to the hard disk drives. The data is later written to the disk drives. Thus caching greatly improves performance of the workstations.

With the posting of the write operations and the inevitable read miss operations, that is read operations to locations which are not contained in the cache, there are then a number of requests which must actually go to the hard disk drives to fully complete the operation. The operating system to this end also contains a disk request scheduler, conventionally an elevator scheduler.

It is noted that the network operation system does not directly control the hard disk drives, but instead driver software is provided by the computer system or disk controller manufacturer for use with the actual subsystem. The driver software interfaces between the operating system and the actual disk drive assemblies to control operation. Basically the operating system indicates when a request has been received and places the requests on the elevator, with the driver removing requests from the elevator and providing them to the disk drives.

As the hard disk drives are a common, shared element on a LAN, their performance is a crucial item to the overall performance of the network. Should the disk drive subsystem be slow or not capable of readily handling certain circumstances, the overall performance of the LAN will degrade, so that there will be user dissatisfaction and the possible need to acquire further subsystems to improve the network performance to acceptable levels. For this reason it is always desirable to increase the performance of the disk operations as much as possible. Therefore it would be desirable to have driver software located between the operating system and the disk drives which can improve system performance.

It is noted that the disk drive requests on a network can come in several types. Because of the plurality of workstations present, the requests can all be for different files, i.e. to all different locations on the hard disk drives. These are referred to as random requests, that is ones that are not closely associated in physical location on the hard disk drives. Alternatively, a particular workstation can request a very long series of requests, such as when an entire file is being copied. In this case the requests are essentially sequential, which generally allows for greater performance. With a network and a plurality of workstations running a number of different tasks, the file server actually receives a mix of both random and sequential requests, with this mix changing on a frequent basis depending upon the actual programs and tasks being performed by each of the workstations.

In addition, to further complicate matters, modern hard disk drive units preferably conform to the Small Computer System Interface-2 (SCSI-2) standard which allows command tag queuing, that is, the providing of a number of commands to a drive at one time, with the drive then handling the requests, sometimes in the particular order received for simpler drives, but preferably in a more optimized order for more sophisticated drives. Because the file server generally controls a plurality of hard disk drives, it then has the capability of having a large number of requests of a particular type outstanding if command tag queuing is activated. It would be desirable to optimize the driver software to also take into account the variation in sequential and random reads and improve performance depending upon the actual mix of requests being provided to the disk subsystem by varying the number of outstanding requests.

SUMMARY OF THE INVENTION

In a computer system according to the present invention, the number of outstanding read requests to the hard disk drives is varied dynamically based on a determination of the mix of random and sequential requests. If the mix of requests appears to be sequential, the number of actual requests allowed to be outstanding is reduced to allow more opportunity to coalesce sequential operations. On the other hand, if the mix appears to be more highly random, then more requests can be outstanding at a given time to take full advantage of command tag queuing. The number of read requests which can be outstanding at a given time is thus varied based on recent history of sequential versus random requests and on the requests present on the elevator. If the mix has been highly sequential, the number is reduced, whereas if the requests being received have been random requests, the number of outstanding request is slowly increased as the number of random requests increases. In addition, only a limited number of write requests are outstanding at a given time and a total number of requests outstanding is also limited.

By doing the dynamic balancing of the number of outstanding read requests for sequential and random operations, disk drive performance is improved based on the actual mix. Conventionally, a single fixed number of outstanding requests would have been utilized so that in many cases performance would have suffered. The dynamic balancing or optimization according to the present invention allows better tuning based on the particular requests actually being received.

BRIEF DESCRIPTION OF THE DRAWINGS

A better understanding of the present invention can be obtained when the following detailed description of the preferred embodiment is considered in conjunction with following drawings, in which.

DETAILED DESCRIPTION OF THE PREFERRED EMBODIMENT

Figure 1:
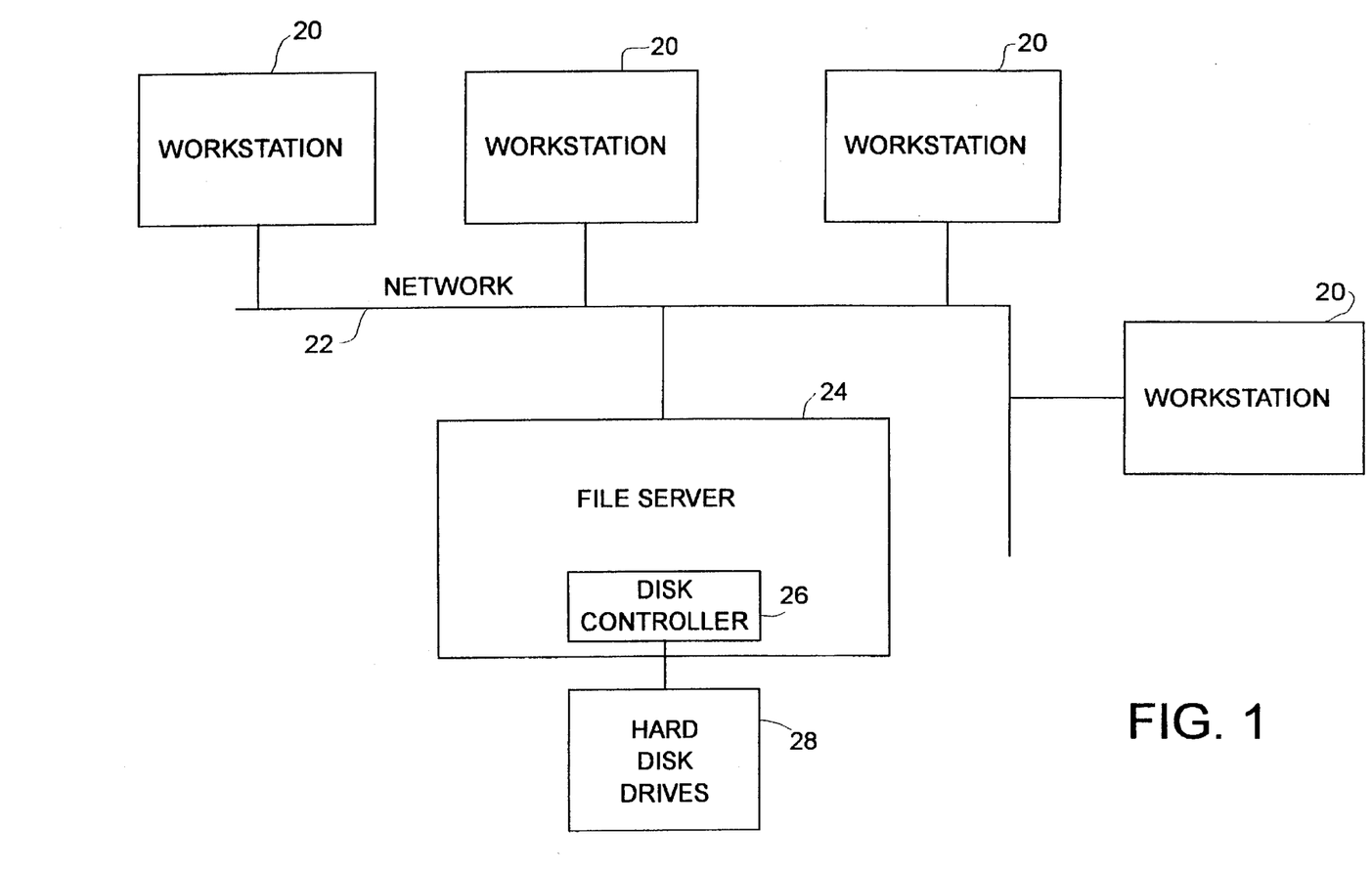
FIG. 1 is a simple block diagram of a local area network.

Proceeding now to FIG. 1, a simple block diagram of a local area network (LAN) is shown. A plurality of workstations 20, typically personal computers, are provided for use by individual operators or users. Each workstation 20 is connected to an electrical network 22, such as an Ethernet or Token Ring network. A simple Ethernet arrangement is illustrated, but it is understood that other arrangements could readily be developed as are well known to those in the networking field. A file server 24 is also connected to the network 22. The file server 24 is typically a variation of a personal computer having increased memory capacities and designed to have high throughput to the network 22 and for hard disk operations. The file server 24 includes a disk controller 26, in the preferred embodiment preferably a SCSI-2 controller, which is in turn connected to a plurality of hard disk drives 28. Again preferably the hard disk drives are SCSI-2 drives as these provide the capability to perform command tag queuing so that a number of individual requests can be outstanding to each individual drive at a particular time. Description of the SCSI-2 protocol and command tag queuing are provided in Draft Proposed American National for Information Systems—SMALL COMPUTER SYSTEM INTERFACE-2 (SCSI-2), Mar. 9, 1990. It is understood that a plurality of hard disk controllers 26, each with a plurality of hard disk drives 28, can be present in the file server 24 and that numerous file servers 24 can be present and connected to the network 22.

Figure 2:
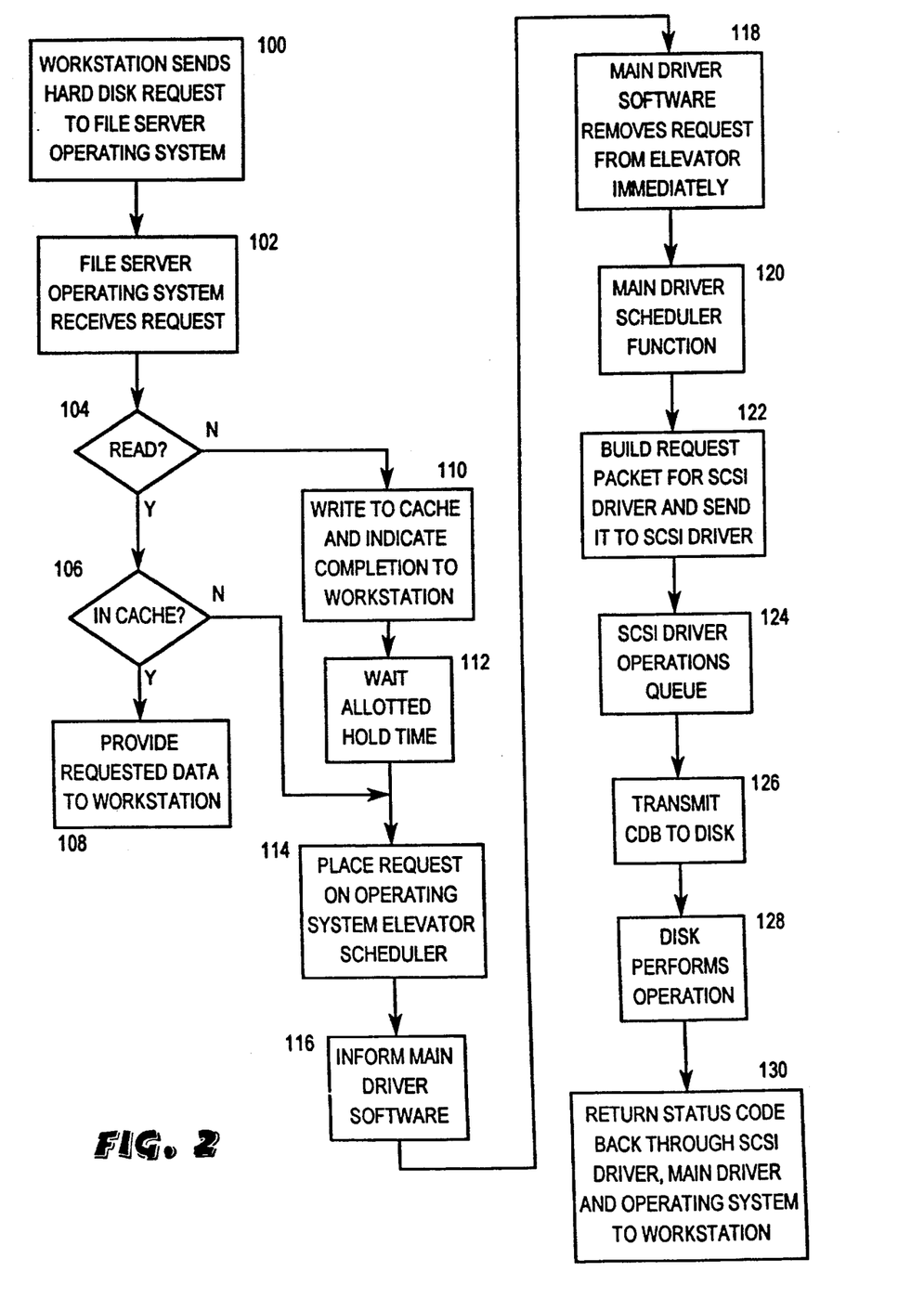
FIG. 2 is a high level flowchart of the history of a request provided by the workstation until a response is returned to the workstation.

FIG. 2 illustrates a simplified flow of information and operations when a workstation requests a hard disk operation. In step 100 the workstation sends the hard disk requests to the file server operating system. Conventionally the workstation 20 will be executing one of various application programs and it will request a particular file or a certain file could be requested by the workstation 20 to execute. The hard disk requests generated by the operating system in the workstation are trapped and provided to the file server 24, which is running an operating system such as NetWare from Novell, VINES from Banyan and others as are well known to those skilled in the art. In step 102 the file server operating system receives the requests from the workstation. In step 104 the file server operating system determines if it is a read request. If so, control proceeds to step 106 to determine if the read request is contained in the cache developed by the file server 24. As stated in the background, one of the main functions of a file server operating system is to form a disk cache to greatly speed up disk request operations either by providing read hits so that read data can be obtained promptly or by posting write operations so that those can be returned as completed to the workstations 20 immediately without having to wait for the operation to complete. If the data is contained in the cache, control proceeds to step 108 where it is provided to the workstation and the thread completes.

If the operation was not a read, control proceeds from step 104 to step 110, where the data is written to the cache maintained by the file server operating system and indicated as complete to the workstation 20. After a certain amount of waiting time in step 112, preferably to allow various sequential operations to gather, control proceeds from step 112 to step 114. This is also where control proceeds from step 106 if a read miss occurred, that is the data was not contained in the cache. In step 114 the request is placed on the file server operating system elevator scheduler. Preferably the operating system uses an elevator scheduling algorithm to control the actual hard disk requests as they are provided to hard disk driver software.

Control proceeds to step 116 where the operating system informs the main driver software that a request has been placed on the scheduler. As noted in the background, the file server operating system does not actually communicate with the hard disk drive but instead driver software is provided by the manufacturer of the disk controller 26. This driver software serves as the main interface between the file server operating system and the actual hard disk drives and performs the function of doing the necessary hardware related operations to transmit the requests to the hard drives. By having this intermediate layer, numerous varieties of hard disk controllers 26 can be provided and interface with a single operating system, thus allowing optimal tuning for a particular system based on operator requirements. Control then proceeds to step 118 where in the preferred embodiment the main driver software immediately removes the request from the elevator of the operating system. In the preferred embodiment the main driver software contains its own elevator scheduler which has been optimized so it is desirable not to allow the operating system elevator scheduler to fully operate. After the request is removed in step 118, control proceeds to step 120 where the main driver scheduler function operates, as will be described below. Control then proceeds to step 122, where the request packet is provided to a SCSI driver. In the preferred embodiment a SCSI driver, which is a lower level interface driver, is utilized to communicate with the actual disk controller hardware. The SCSI driver works with the SCSI controller and will receive requests from any other drivers which need access to devices on the SCSI bus, so this additional driver layer is used to combine requests from the various sources. This is distinguished from the main driver in this description, which receives only hard disk requests from the file server operating system. Other device-type specific drivers would receive the operating system requests for those devices and if SCSI devices, would then interface with the SCSI driver. The other SCSI devices could include tape and Compact Disc-Read Only Memory (CD-ROM) drives, but for this description the interest is only for hard disk requests. The packet request is built in step 122 and transferred to the SCSI driver for the SCSI driver to perform the request to the drives. Control proceeds to step 124 where the request goes into the SCSI driver operations queue and then to step 126 where the actual request CDB or command descriptor block as defined by SCSI is transmitted to the disk drive.

Control proceeds to step 128, where the disk drive performs the requested operation. In step 130 the disk drive returns a status code, back to the SCSI driver and any data is transferred to the destination buffer specified in the request to the controller, the destination buffer location originally being specified by the operating system and passed as a request parameter. The SCSI driver in turn indicates to the main driver that the request has been completed. The main driver then informs the operating system of the completion and provides the status to the file server operating system, which in turn transfers the status and any data from the destination buffer to the workstation 20. The operation of the main driver software as outlined in steps 116, 118, 120 and 122 is described in more detail below.

Preferably the operating system is NetWare and is unchanged as provided from Novell. The SCSI driver software is also effectively unchanged from the low level software actually utilized to handle the interface with the various SCSI controllers and SCSI chips and the packet provided is of the desired format. Thus the preferred embodiment is best described as the main driver software which is interleaved between those two levels of software, but could be incorporated into either of them or other partitions could be developed. It is also noted that the main driver software is a number of multi-tasking modules, many of which are running concurrently and others of which are activated upon request and then terminate.

Figure 3:
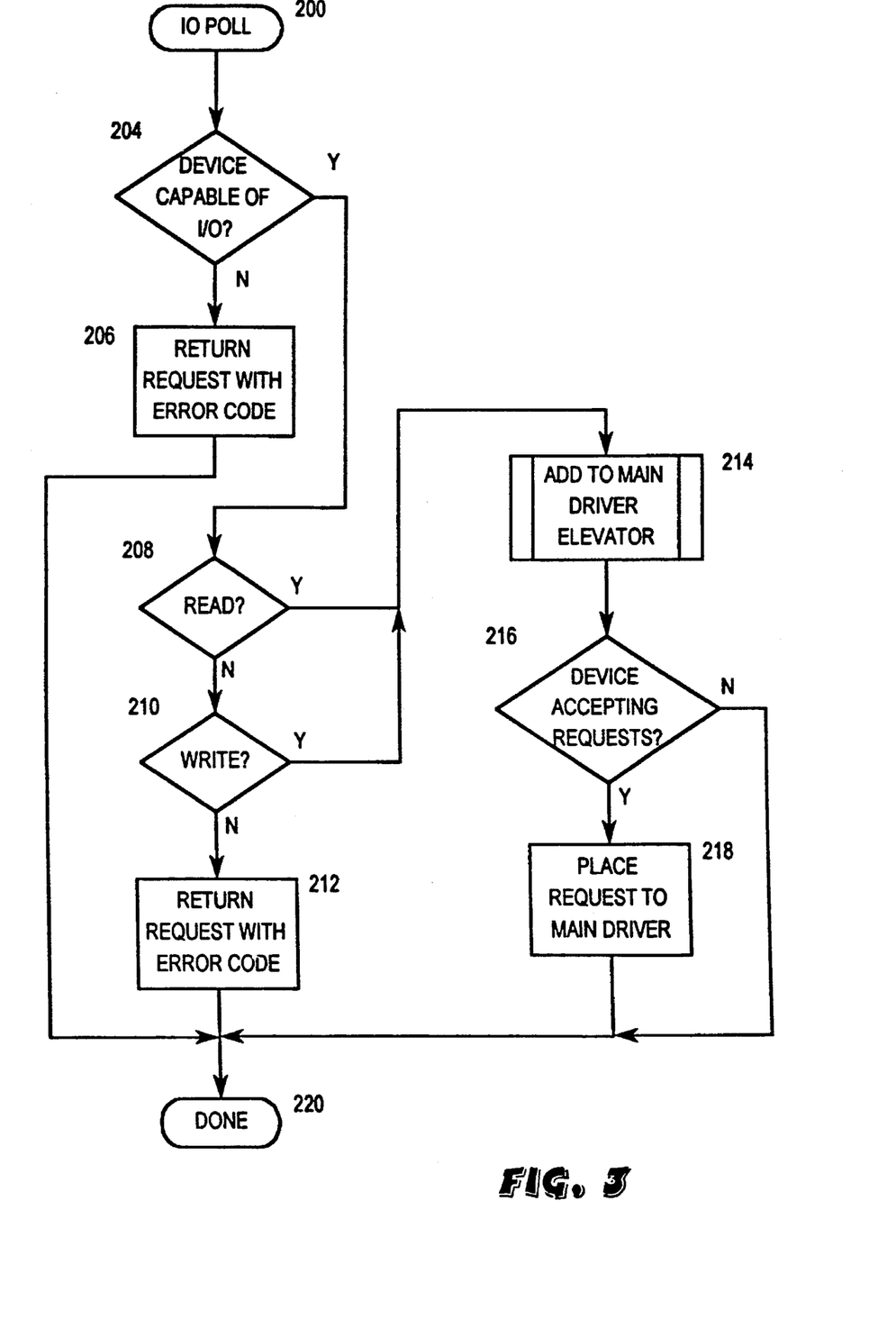
FIG. 3 is a flowchart of a sequence in the main driver software to obtain drive requests from the operating system as contained.

One of the first sequences in the main driver software is the I/O POLL sequence 200 (FIG. 3), which is executed upon the operating software informing the main driver of the presence of a request on the elevator in step 116. In step 204 if a request has been received to determine if the device being indicated in the request is capable of performing I/O operations. There are numerous reasons why it may not be available, such as it is not even present, it has failed, it is overheated, or it has been deactivated. In those cases where it is not capable of I/O, control proceeds to step 206, where the request is returned back to the operating system with an appropriate error code indicating the failure reason. If it is capable of I/O, control proceeds to step 208 to determine if it is a read function. If not control proceeds to step 210 to determine if the requested operation is a write. If not, control proceeds to step 212 because it is an invalid request. So the request is returned to the operating system along with the appropriate error code and control proceeds to step 220.

If the request is a read or a write, control proceeds from steps 208 and 210 to step 214, where the ADD TO MAIN DRIVER ELEVATOR sequence 250 (FIGS. 4A and 4B) is executed to add the request to the elevator in the main driver software. The sequence 250 is described in more detail below. Control then proceeds to step 216 to determine if the particular device is accepting requests. If not, control proceeds to step 220. The request will ultimately be performed because it has been placed on the elevator but just not immediately. If the device is accepting requests, control proceeds to step 218, where a request is placed to the main driver software to activate and perform the operation. After step 218, control proceeds to step 220. Therefore it is noted that if the disk drive device is capable of actually performing the I/O operation, the request is immediately taken off of the elevator provided by the operating system and added to the main driver elevator. In this manner the elevator contained in the operating system is effectively bypassed to allow more control by the optimization of the main driver software.

Figure 4A:
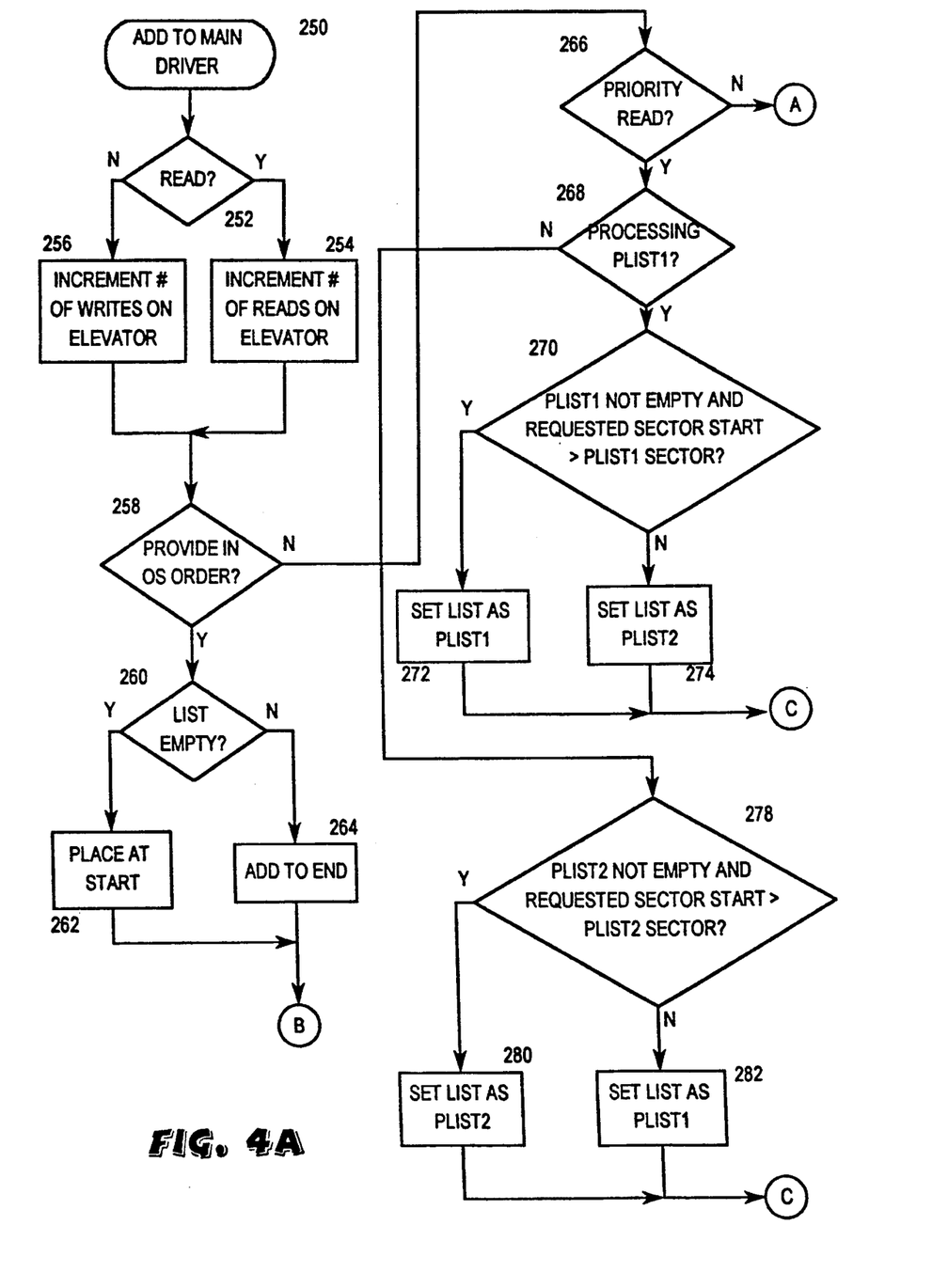
FIGS. 4A and 4B are a flowchart of a sequence in the main driver for adding tasks received from the operating system.
Figure 4B:
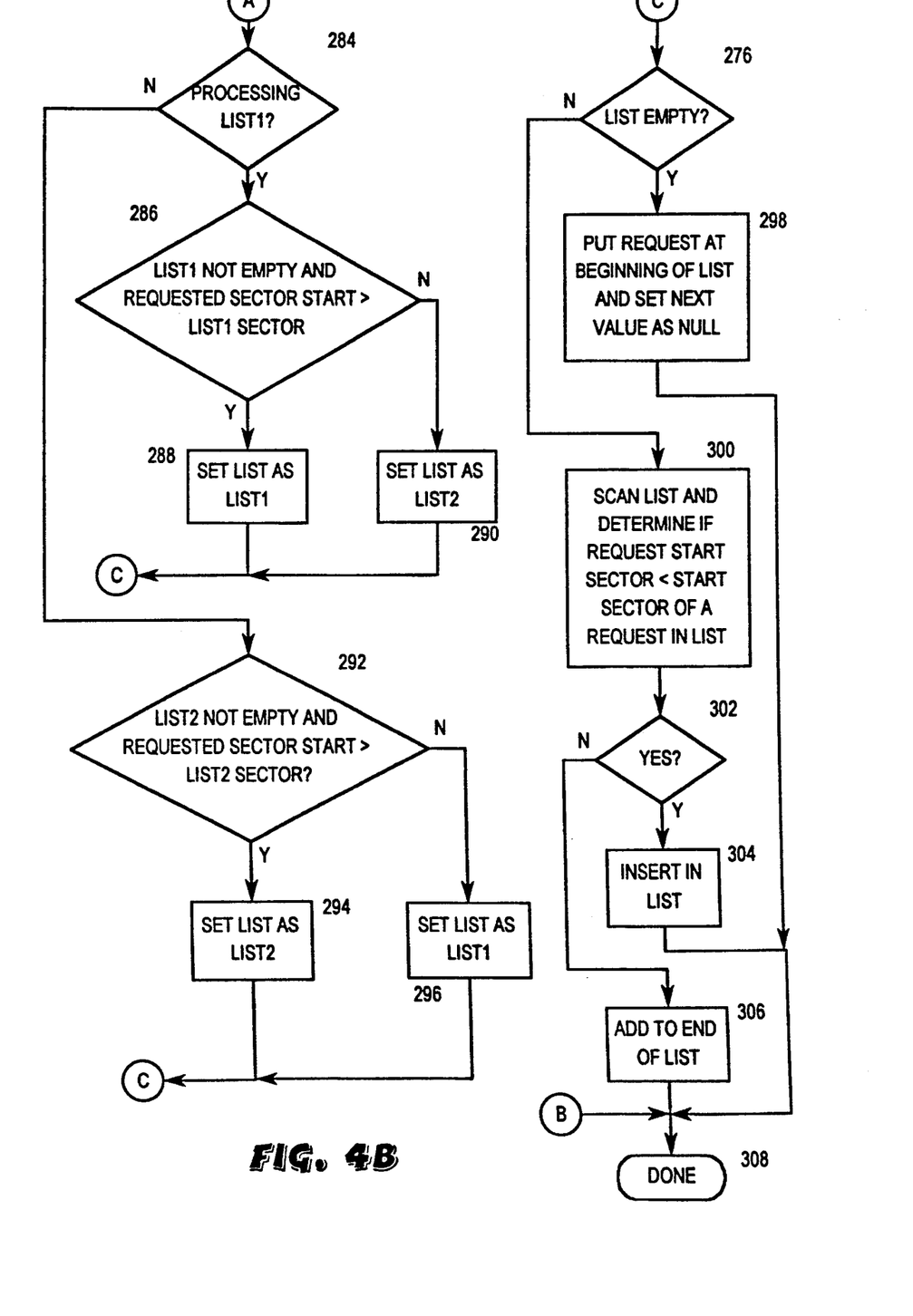

The ADD TO MAIN DRIVER sequence 250 is illustrated in FIGS. 4A and 4B. In step 252 a determination is made whether the requested operation is a read or a write. If it is a read, control proceeds to step 254, where the number of reads on the elevator is incremented. If it is a write, control proceeds to step 256 where the number of writes on the elevator is incremented. Control then proceeds from step 254 or 256 to step 258 to determine if the requests are to be provided in order provided by the operating system. This is done by evaluating any command line options present when the main driver software was original loaded or by checking a flag as set by setup software not described herein but well known to those skilled in the art. If operating system order is indicated, control proceeds to step 260 to determine if the list forming the elevator is empty. If so, control proceeds to step 262 and the request is placed at the start of the list. If not, control proceeds to step 264 where the request is added to the end of the list. Control proceeds from step 262 and 264 to step 252.

If the operations were not to be provided in operating system order but in the more optimal order developed by the main driver software, control proceeds from step 258 to step 266 to begin determining the proper list to receive the request. The preferred embodiment actually has four lists, two for priority and two for normal requests. Two lists are used for each case as normal for elevator scheduling. In the preferred embodiment, all the lists are kept in ascending order for simplicity, but ascending and descending order lists could be utilized if desired.

Step 266 determines if the request is a priority read operation. In the preferred embodiment read operations can either be priority or non-priority. Preferably they are all set as priority operations because with write posting, the largest performance penalty then develops for read misses. To reduce the read miss penalty preferably all read operations are designated as priority reads. However, this need not be the case and operation will perform according to the invention in either event. Priority status is indicated by another command line option or setup flag.

Control proceeds from step 266 to step 268 if it is a priority read operation. Step 268 determines if the priority list 1 is being processed. If so, control proceeds to step 270 to determine if the priority list 1 is not empty and that the requested sector being processed in the new request is greater than the current sector in priority list 1. If so, this would indicate that the priority list 1 does contain requests and that the new request is after the current sector being executed. If so, control proceeds to step 272 where a variable referred to as LIST is set to a value of PLIST1. If not, control proceeds to step 274 where the variable LIST is set equal to the value of PLIST2. Control then proceeds from steps 272 or 274 to step 276 (FIG. 4B).

If priority list 1 was not currently being processed in step 268, control proceeds to step 278 to determine if priority list 2, the second of the priority elevator lists, is not empty and the requested sector starting address is greater than the sector being processed in priority list 2. If so, control proceeds to step 280 where the variable LIST is set to the PLIST2 and if not, control proceeds to step 282 where the variable LIST is set equal to PLIST1. Control proceeds from steps 280 and 282 to step 276. Thus by steps 268 to 282 the proper list to receive the request for priority reads is developed.

If a priority read is not occurring as determined in step 266, control proceeds to step 284 (FIG. 4B) to determine if normal list 1 is being processed. If so, control proceeds to step 268 to determine if list 1 is not empty and the requested starting sector is greater then the list 1 sector. If so, control proceeds to step 288, where the variable LIST is set equal to LIST1 and if not, control proceeds to step 290 where the variable LIST is set equal to LIST2. Control then proceeds from steps 288 and 290 to step 276. If list 1 was not being processed, control proceeds from step 284 to step 292, where a determination is made whether list 2 is not empty and the requested starting sector is greater than the list 2 sector. If so, control proceeds to step 294 where the variable LIST is set equal to LIST2 and if not, control proceeds to step 296 where the variable LIST is set equal to LIST1. Control proceeds from steps 294 and 296 to step 276.

Thus steps 268 to 296 determine the proper list to receive the new request.

Step 276 determines whether the list as indicated by the LIST variable is empty. If so, control proceeds to step 298, where the request is placed at the beginning of the list as indicated by the LIST variable and the next value in the request is set to indicate that there is no request and this is the final request. Preferably the actual lists are maintained as a link list structure, with each entry having a pointer to the next request in the list. After step 298 is completed, control proceeds to step 308 and the sequence 250 terminates.

If the list is not empty as determined in step 276, control proceeds to step 300 where the appropriate list as indicated by the LIST variable is scanned to determine if the starting sector of the request is less than the starting sector of any request in the particular list. In step 302 a determination is made whether this condition is true. If so, in step 304 the request is inserted into the middle of the list as indicated by the list variable. This is done by properly changing the next pointer in the request after which the new request is to be inserted and to have the new request next pointer indicate the one after where it is to be inserted. If the test is false in step 302, control proceeds to step 306, where the request is added to the end of the list. Control then proceeds to step 308 where the sequence terminates.

The START REQUEST sequence 350 is utilized to start the requests once one has been received from the operating system. Control commences at step 352 to determine if a request has been received and is present. If not, control remains at step 352. If a request has been received, control proceeds to step 354 to determine if the device that is requested is prepared to receive commands. If not, control returns to step 352. If so, control proceeds to step 356 to determine if it is time to send a request to the SCSI driver, which will then proceed to queue the request and transmit it to the hard disk drives. This determination is made by calling a sequence referred to as the DECIDE TO SEND REQUEST sequence 450 (FIGS. 6A and 6B) which is described in more detail below. If it is not time to send the next request, control returns back to step 352. Control then proceeds to step 358 where a determination is made whether there is room in the memory structure to actually build the particular request. If not, control again returns to step 352. If so, control proceeds to step 360 where a variable is set to indicate that a request is being built. This is referred to as building a normal request. Control then proceeds to step 362 where a GET NEXT REQUEST FROM ELEVATOR sequence 450 (FIGS. 7A and 7B) is executed so that the actual request is obtained from the main driver elevator list. Control then proceeds to step 364 to determine if there actually were any requests on the elevator. If not, a null value or error value will have been returned. If no requests were present, control returns to step 352.

Figure 5A:
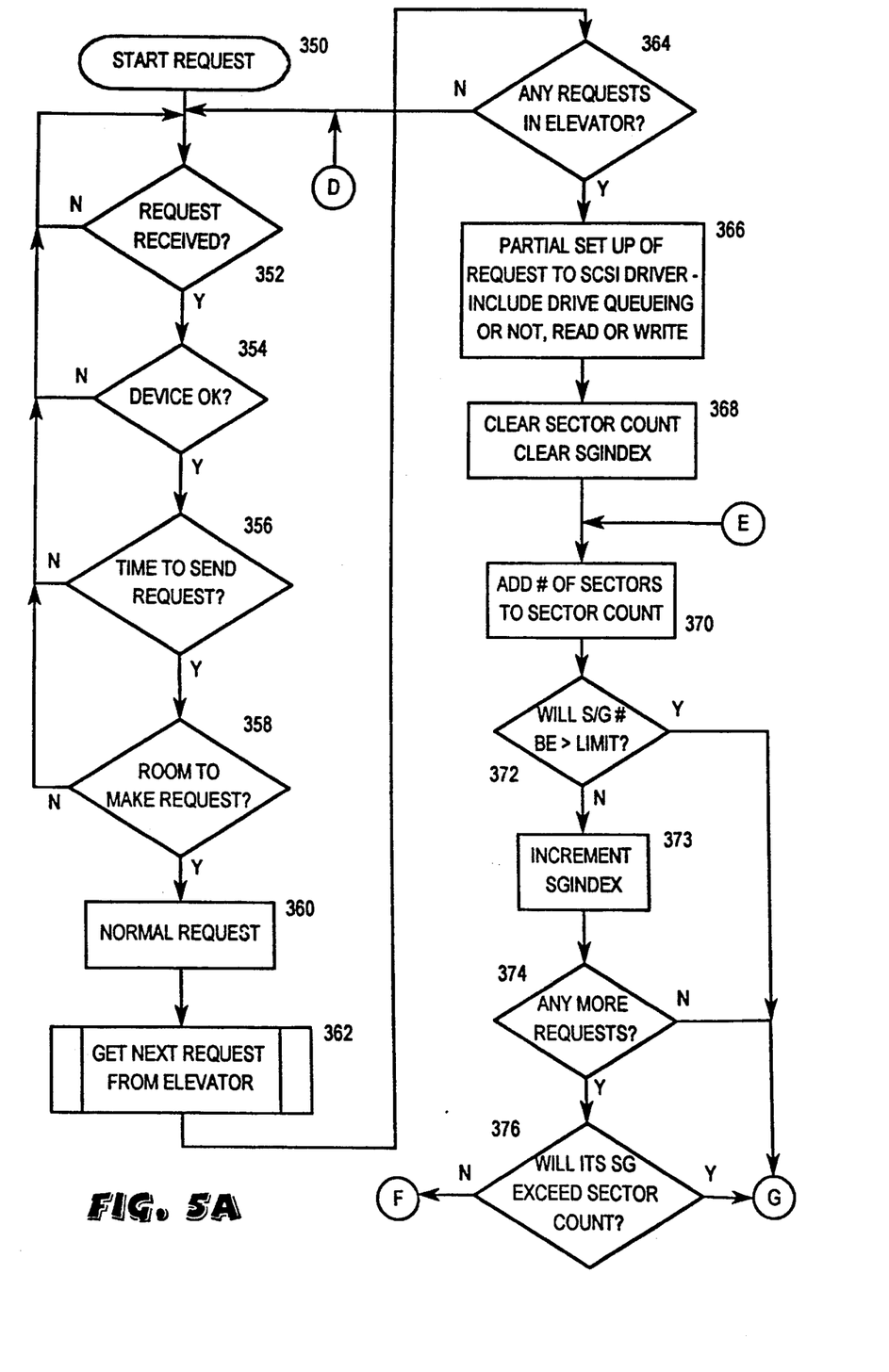
FIG. 5A and 5B is a flowchart of a sequence in the main driver for submitting requests to a lower level SCSI driver.
Figure 5B:
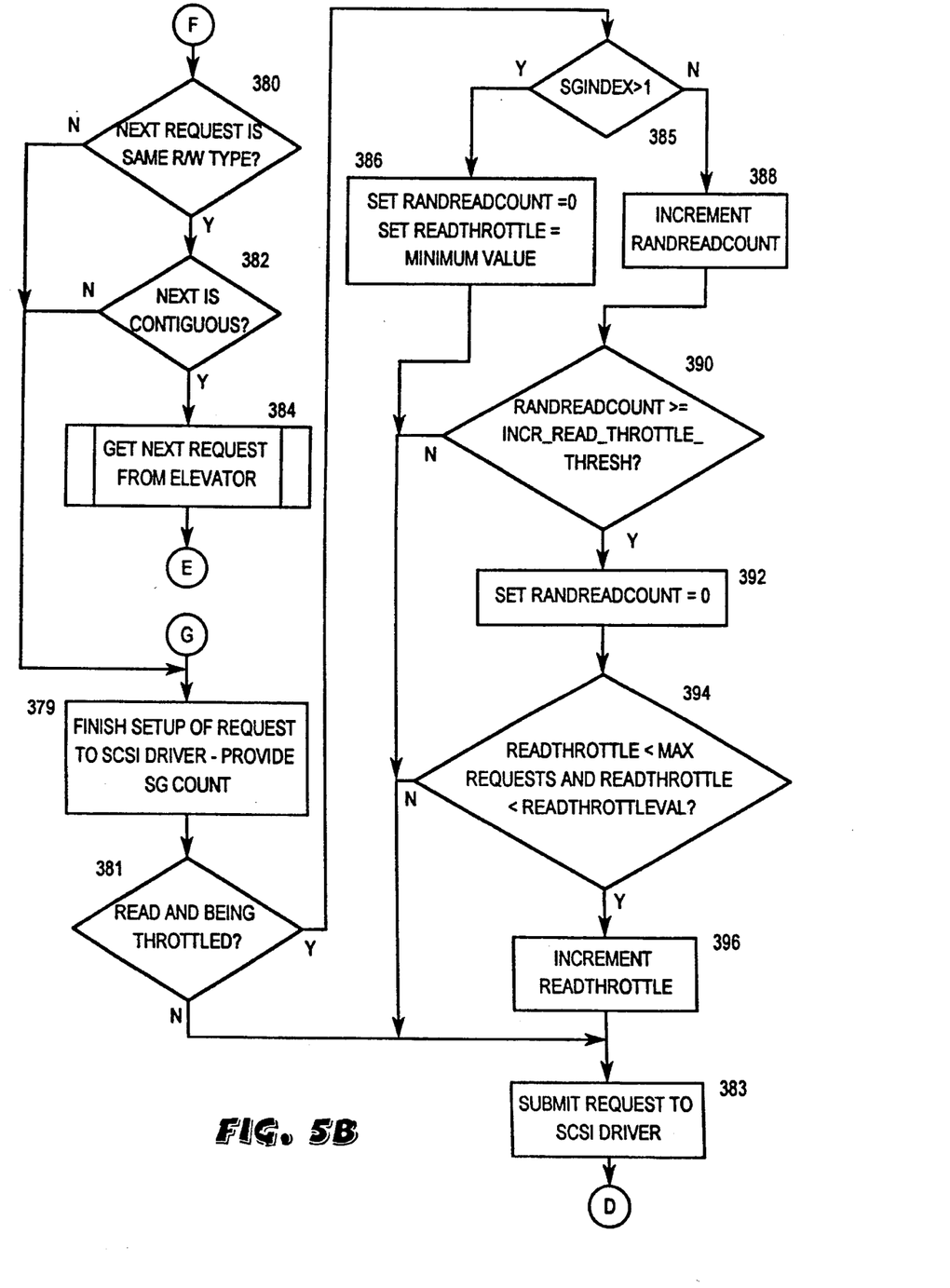

If there were requests, control proceeds to step 366 where the actual request provided to the SCSI driver software is partially setup. This includes indicating whether command tag queuing is to be utilized or not and whether the request is a read or write request. Control proceeds to step 368, where a variable for counting the number of sectors in the request is cleared and a variable SG_INDEX or scatter gather index is also cleared. Preferably each request to the SCSI driver is limited to a given number of sectors and to a given number of blocks in the scatter/gather. Control then proceeds to step 370, where the number of sectors in the request is added to the SECTOR COUNT variable. Control proceeds to step 372 to determine if the scatter/gather number will be greater than a desired limit if the particular request is added. Again it is noted there is a particular limit and doing this calculation is a check to determine that it will not exceed that limit. If this scatter/gather will not exceed the number of scatter/gathers to be executed, control proceeds to step 373, where the SG_INDEX variable is incremented. Control then proceeds to step 374 to determine if there are any more requests outstanding. If so, control proceeds to step 376 to determine if the number of sectors to be obtained by the scatter/gather for the next request will exceed the maximum sector count value. If so, if the number of scatter gathers exceed the limits in step 372 or there were no more requests in step 374, control proceeds to step 379 (FIG. 5B).

If it will not exceed the sector count in step 376, control proceeds to step 380 to determine if the next request is the same read/write type. That is, it is a read if the current request is a read or is it a write if the current request is a write. If not, control proceeds to step 379. If so, control proceeds to step 382 to determine if the next request is contiguous with the present request. This allows coalescing of contiguous requests into a single request to improve operation. If not, control proceeds to step 379. If so, in step 384 the GET NEXT REQUEST FROM ELEVATOR sequence 450 is executed to obtain the next request. After step 384 control returns to step 370 so that this loop is then continued until one of the break out conditions to cause transfer to step 379 is noted. Thus this loop allows coalescing of contiguous, same type operations to improve performance.

In step 379 the final setting up of the request to the SCSI driver is completed, including providing the actual scatter/gather count. Control proceeds to step 381 to determine if the request is a read request and read operations are being throttled to allow only a given number to be outstanding. In the preferred embodiment it is desirable to limit the actual number of read requests outstanding and the total number of requests outstanding to allow coalescing to occur for sequential operations. This throttling is indicated by a setup flag or command line option. If the operation is a write or it is not being throttled, control proceeds to step 383 where the request is actually sent to the SCSI driver. After the request is sent, control returns to step 352. If it is a read request and it is being throttled, control proceeds to step 385 to determine if the SG_INDEX value is greater than 1. If so, this would indicate that a number of requests have been coalesced, indicating sequential operation. Therefore if the answer is yes, sequential operation is indicated and control proceeds to step 386 where a variable RANDREADCOUNT is set equal to 0 and a variable READTHROTTLE is set to a predetermined minimum value, preferably 2. Thus if it is determined that sequential operations are appearing to occur, then it is desirable to limit the actual number of requests outstanding to maximize the coalescing of requests. After step 386 control proceeds to step 383.

If however, the SG_INDEX value is not greater then 1, control proceeds to step 388 where the variable RANDREADCOUNT is incremented. This indicates that at least another random read has occurred. Control then proceeds to step 390 to determine if the RANDREADCOUNT variable is greater than or equal to the INCR_READ_THROTTLE_THRESH value. If the number of random reads that has occurred in a sequence is above a given threshold number, it is considered desirable to increase the number of random reads that can be outstanding at any time. This is desirable as it is being determined that more and more random operations are occurring and sequential operations are effectively not occurring. It is considered desirable to have more random operations outstanding to receive the maximum benefits of command tag queuing and any ordering done by the drives. If the RANDREADCOUNT variable is not greater than the threshold, control proceeds to step 383. If it is, control proceeds to step 392 where the RANDREADCOUNT variable is set equal to zero. Control then proceeds to step 394 to determine if the READTHROTTLE variable is less than the number of maximum number of requests allowed and if the READTHROTTLE variable is less than a variable referred to as READTHROTTLEVAL, the maximum read throttle value. Preferably the maximum number of requests is 8 while the READTHROTTLEVAL defaults to a maximum of 8. It is determined that there should be some limit on the actual number of read requests outstanding. In this case 8 is the preferred limit value as the sequences described herein are preferably performed for each individual hard disk drive and 8 is the current limit for the number of requests provided by command tag queuing in hard disk drives. If the read throttle is not less than both of these values, control proceeds to step 383. If it is less than both of the values, then it is desirable to increment the READTHROTTLE value and this is done in step 396. Control then proceeds to step 383.

Therefore it can be seen that the START REQUEST sequence 350 coalesces any sequential operations and also determines whether operations are generally sequential or are basically random. When there are sequential requests, the number of outstanding requests is limited, whereas if the requests are random, the number of outstanding requests generally increases as the randomness continues, up to a predetermined maximum. Thus the logic of sequence 350 allows the dynamic changing of the number of outstanding requests based on the nature of the requests actually being received.

Figure 6A:
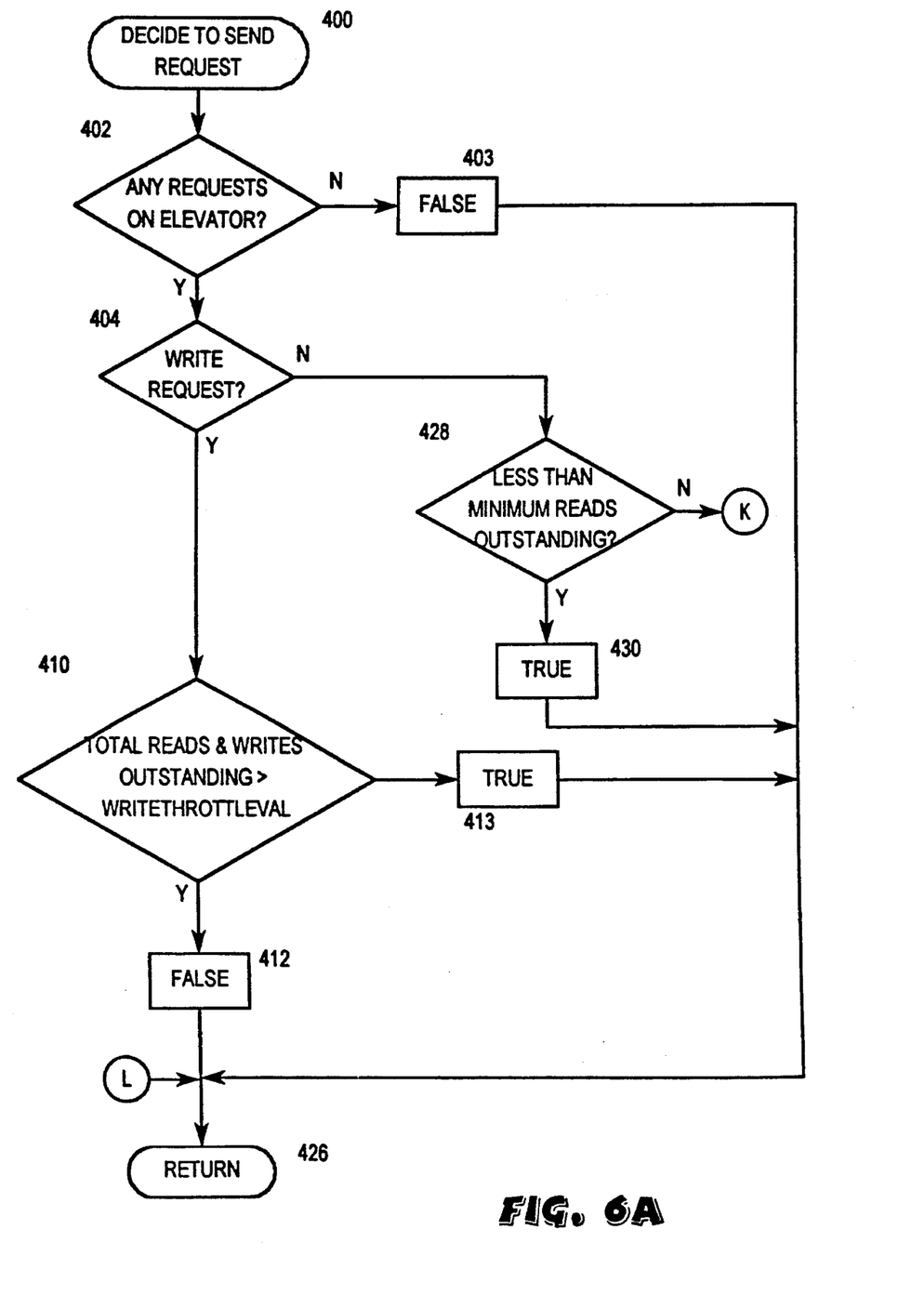
FIGS. 6A and 6B are flowcharts of a sequence in the main driver to determine if it is appropriate to send a request to the lowerlevel hard disk driver from the main driver.

The DECIDE TO SEND REQUEST sequence 400 commences at step 402 by determining whether there are any requests on the elevator. If not, a flag is set in step 403 to false to indicate that it is not time to send any requests. If there are any requests, control proceeds to step 404 to determine if it is a write request. If so, control proceeds to step 410 to determine if the total number of reads and writes outstanding is greater than a variable referred to as WRITETHROTTLEVAL. Preferably this value is 2, so that the mix can not contain too many writes because of the bias to perform reads. If so, control proceeds to step 412 where the flag is set to false. If not, the flag is set to true at step 413.

Figure 6B:
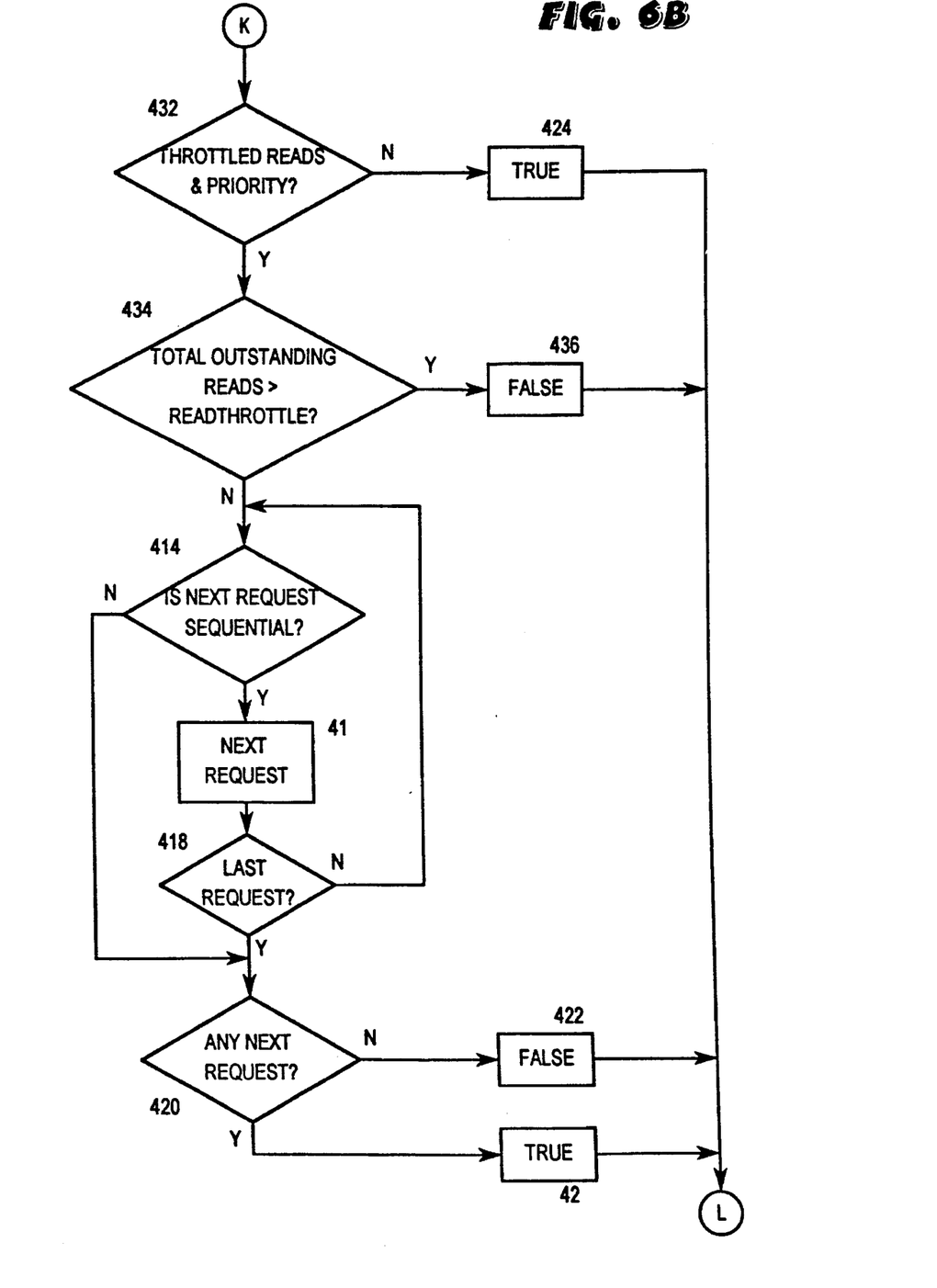

If it was not a write request as determined in step 404, control proceeds to step 428 to determine if less than the minimum number of reads is outstanding. Preferably this number is 2 so that there can always be at least 1 read outstanding. If it is less, control proceeds to step 430 where the flag value is set to true and then control proceeds to step 426. If not, control proceeds to step 432 to determine if reads are being throttled and it is a priority read request. If the answer is no, control then proceeds to step 424 to set the flag true. Throttling of reads is also preferably a set up condition, and it is preferred to be set. If they are being throttled and it is a priority request, control proceeds to step 434 to determine if the total number of outstanding reads is greater than the dynamic READTHROTTLE variable. If so, control proceeds to step 436, where the flag value is set to false. If the total number of reads is less than the READTHROTTLE value, control then proceeds to step 414. Step 414 determines if the next request is sequential with the current request. If so, control proceeds to step 416 where the next request obtained. In step 418 it is determined if this is the last request. If not, control returns to step 414. If so, or if the next request was not sequential, control proceeds to step 420. In step 420 a determination is made whether there is a next request. If not, control proceeds to step 422 where the flag is set to false. If so, control proceeds to step 421 where the flag is set to a true value. After steps 422 and 424 control proceeds to step 426, which is also where control proceeds after any of the flag values are set. Step 426 is a return from the sequence.

Thus the DECIDE TO SEND REQUEST sequence 400 allows at least a minimum number of reads to be outstanding and keeps the number of writes to a given minimum because of a bias towards read operations to improve performance. If throttling of reads is occurring, as is preferable, the total number of outstanding reads is equivalent to the READTHROTTLE value, which in the previous sequence 350 was shown to be a variable based on the mix of sequential and random operations occurring.

Figure 7A:
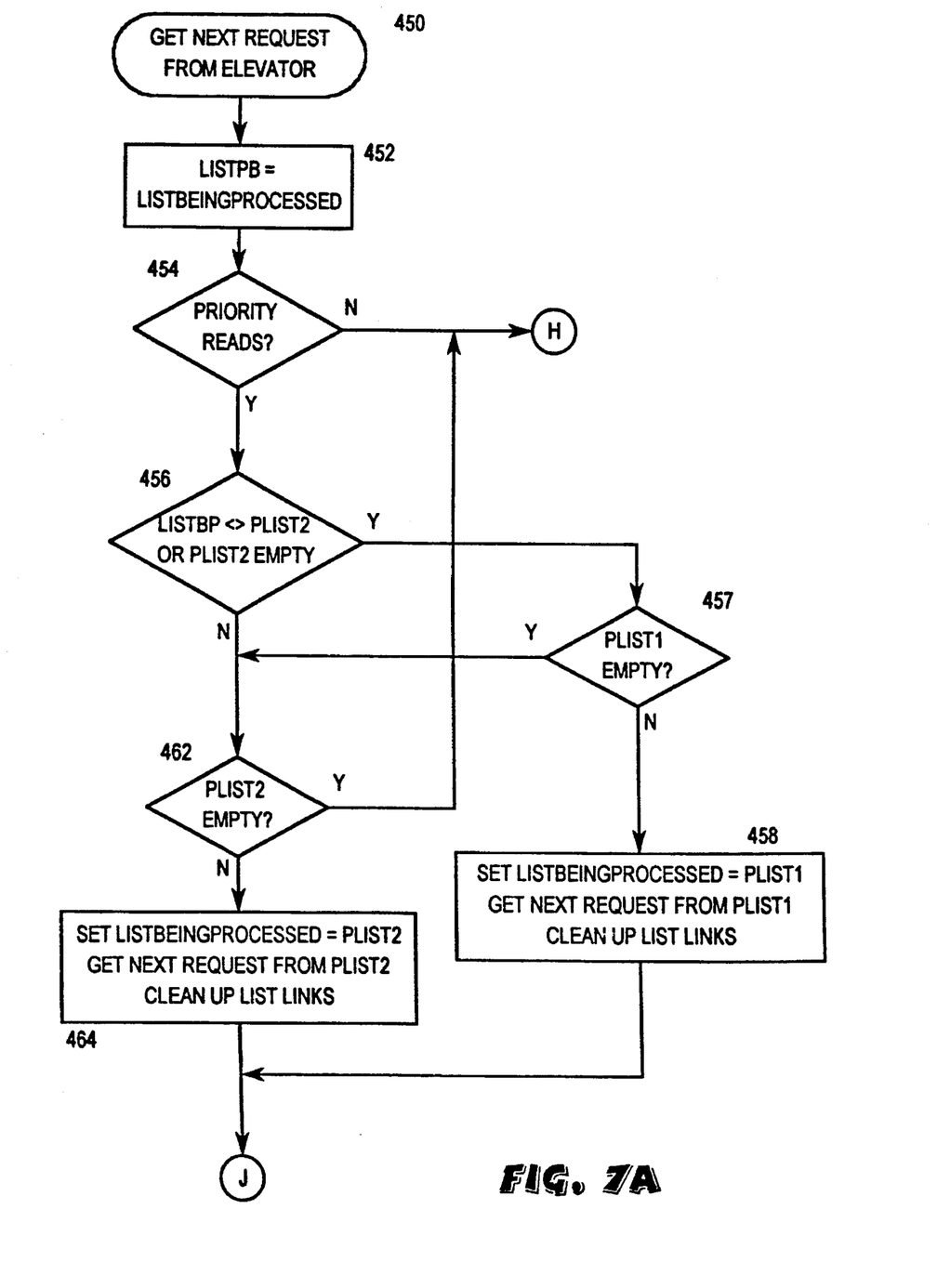
FIGS. 7A and 7B are a flowchart of a sequence in the main driver to obtain a request from an elevator scheduler.

The GET NEXT REQUEST FROM ELEVATOR sequence 450 commences operation in step 452 where a variable LISTPB is set equal to the list being processed, such as PLIST1, PLIST2, etc. This is used in this sequence 450 which determines which list is being processed and then removes the next request from that list. Control proceeds to step 454 to determine if priority reads are set. If so, control proceeds to step 456 to determine if the LISTBP variable is not equal to PLIST2 or if priority list 2 is empty. If so, control proceeds to step 457 to determine if priority list 1 is empty. If not, control proceeds to step 458 where the list being processed variable is set equal to PLIST1, the next request is actually obtained from priority list 1 and the link list is cleaned up. Control then proceeds to step 460. If the condition was false in step 456 or priority list 1 was empty in step 457, control proceeds to step 462 to determine if priority list 2 is empty. If not, control proceeds to step 464 where the list being processed variable is set equal to PLIST2, the next request is obtained from the priority list 2 and the list link is cleaned up. Control then proceeds to step 460.

If priority list 2 was empty at step 462 or priority reads were not in effect as determined in step 54, control proceeds to step 468 (FIG. 7B) to determine if the LISTBP variable is not equal to LIST2 or if list 2 is empty. If so, control proceeds to step 470 to determine if LIST1 is empty. If not, control proceeds to step 472 where the list being processed variable is set equal to list 1, the next request is actually obtained from list 1 and the link list is cleaned up. Control then proceeds to step 460. If the test in step 468 was false or if list 1 was empty in step 470, control proceeds to step 474 to determine if list 2 is empty. If not, control proceeds to step 476 where the list being processed variable is set equal to LIST2, the next request is retrieved from list 2 and the link list is cleaned up. Control then proceeds to step 460.

Figure 7B:
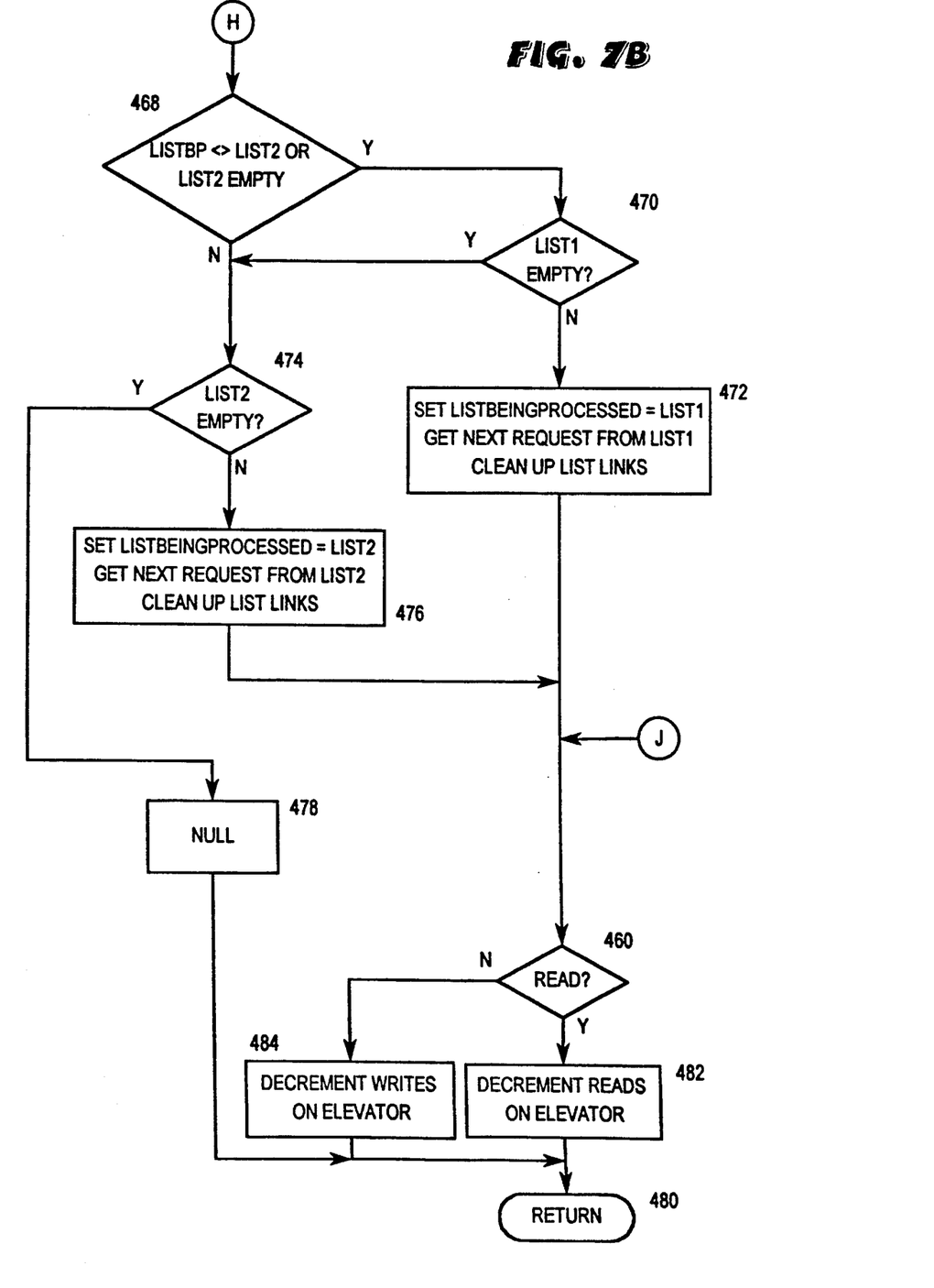

If list 2 was empty in step 474, this is an indication that all the lists are empty and there actually is no request. So control proceeds to step 478 where a null variable indicator is set and then to step 480 which is a return from the sequence 450.

In step 460 a determination is made whether a read request has been obtained. If so, control proceeds to step 482 where the number of reads on the elevator is decremented. Otherwise control proceeds to step 484 where the number of writes on the elevator is decremented. Control proceeds from step 484 to step 480.

Figure 8:
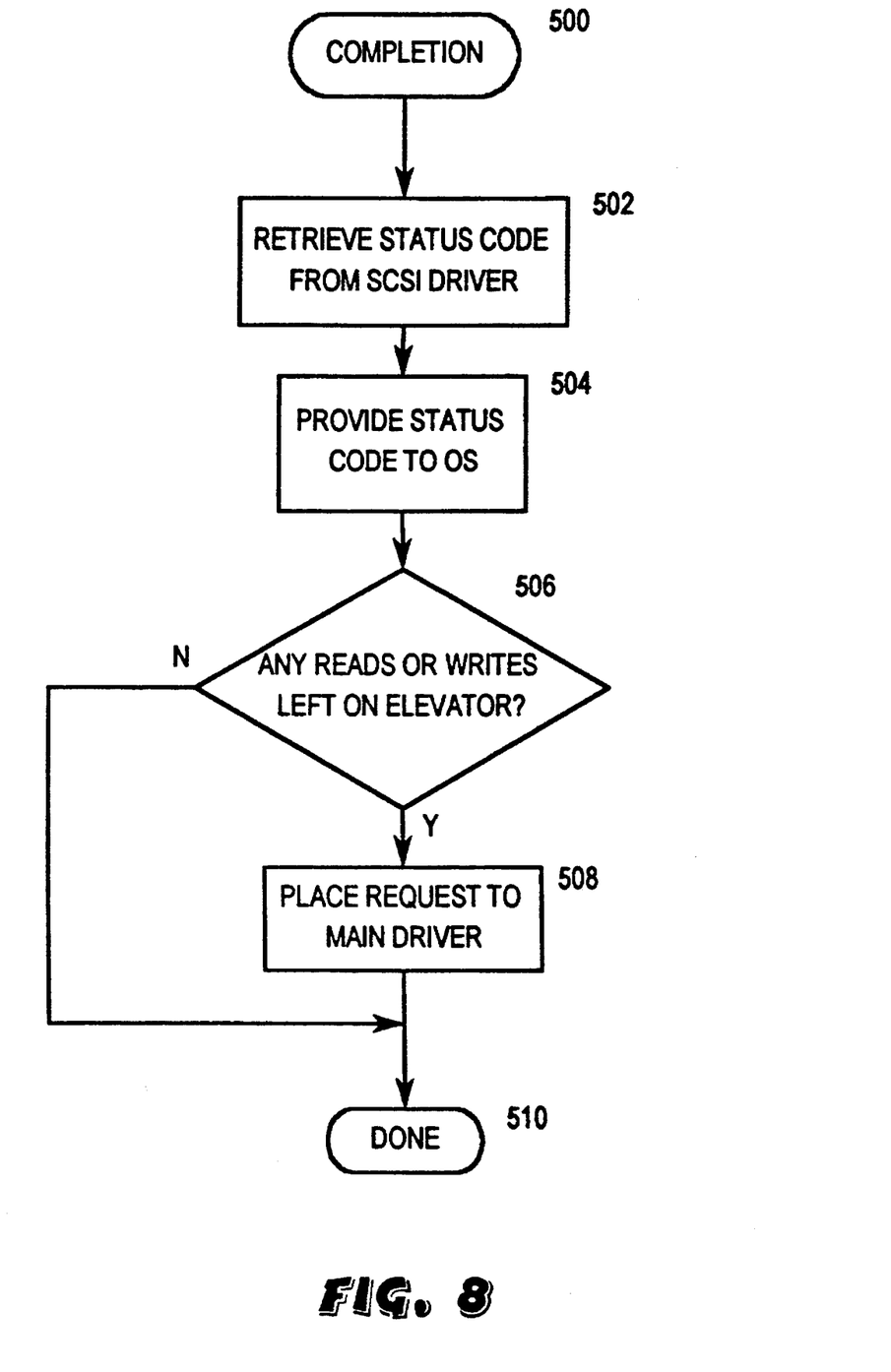
FIG. 8 is a flowchart of the operations upon completion of a disk request.

It is also noted that certain operations occur when the request is completed by the disk drives. An outline of this is shown in FIG. 8 with the COMPLETION sequence 500. The sequence 500 commences at step 502 where the status code operations is retrieved from the SCSI driver sequence, which will have obtained similar information from the actual drive itself. This information is then provided to the operating system in step 504 and control proceeds to step 506. Step 506 is a determination whether any reads or writes are still left on any elevator. This is done by checking the appropriate variables. If so, control proceeds to step 508 where the request is placed to the main driver, particularly the START REQUEST sequence 350, so that the elevator operations can be continued. After step 508 or if there were no reads or writes left and the elevators were empty in step 508, control proceeds to step 510 and the operation of the COMPLETION sequence 500 completes.

Therefore it can be seen that the preferred embodiment allows a dynamic balancing or changing of the number of read requests outstanding based on whether the requests received are sequential or whether they are random reads which access numerous locations. If they are random reads and the string of random reads continues for some period of time, a greater and greater number will be allowed to be outstanding to the drives until a certain maximum is obtained to take advantage of command tag queuing present in SCSI-2 drives. If a sequential operation is received, the available number of outstanding operations is reduced to a much smaller number to allow greater coalescing of requests. This technique improves the performance of the disk subsystem by allowing the request queues to be actively changed based on the ongoing history of operations, rather than being a single fixed value which is preset and often in error.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method for scheduling read requests to disk drives, the disk drives being capable of having a number of outstanding read requests, the method comprising the steps of:

receiving a read request;

determining if the read request is a random request;

if a sequential read request, setting a first predetermined value as the maximum number of possible outstanding read requests;

if a random read request, determining how many consecutive random requests have occurred;

if this number of consecutive random read requests exceeds a second predetermined value, incrementing the maximum number of possible outstanding read requests to a maximum of a third predetermined value, where said third predetermined value is greater than said first predetermined value; and determining if the number of read requests outstanding exceeds said maximum number of possible outstanding read requests and issuing the read request if not exceeded.

2. The method of claim 1, further comprising the step of:

determining if the number of read requests outstanding is less than a fourth predetermined value and issuing the read request if less.

3. A method for scheduling requests to disk drives, the disk drives being capable of having a number of outstanding read and write requests, the method comprising the steps of:

receiving a request;

determining if the request is a read request;

if a sequential read request, setting a first predetermined value as the maximum number of possible outstanding read requests;

if a random read request, determining how many consecutive random requests have occurred;

if this number of consecutive random read requests exceeds a second predetermined value, incrementing the maximum number of possible outstanding read requests to a maximum of a third predetermined value, where said third predetermined value is greater than said first predetermined value;

determining if the number of read requests outstanding exceeds said maximum number of possible outstanding read requests and issuing the read request if not exceeded;

determining if the request is a write request; and if a write request, determining if the total number of outstanding read and write requests exceeds a fourth predetermined value and issuing the write request if not exceeded.

4. The method of claim 3, further comprising the step of:

determining if the number of read requests outstanding is less than a fifth predetermined value and issuing the read request if less.

\* \* \* \* \*